May 29, 1962     W. BEIERBACH ETAL     3,036,862
ADJUSTING DEVICE FOR A FOLDING BACK FOR A VEHICLE SEAT
Filed Jan. 26, 1960     2 Sheets-Sheet 1
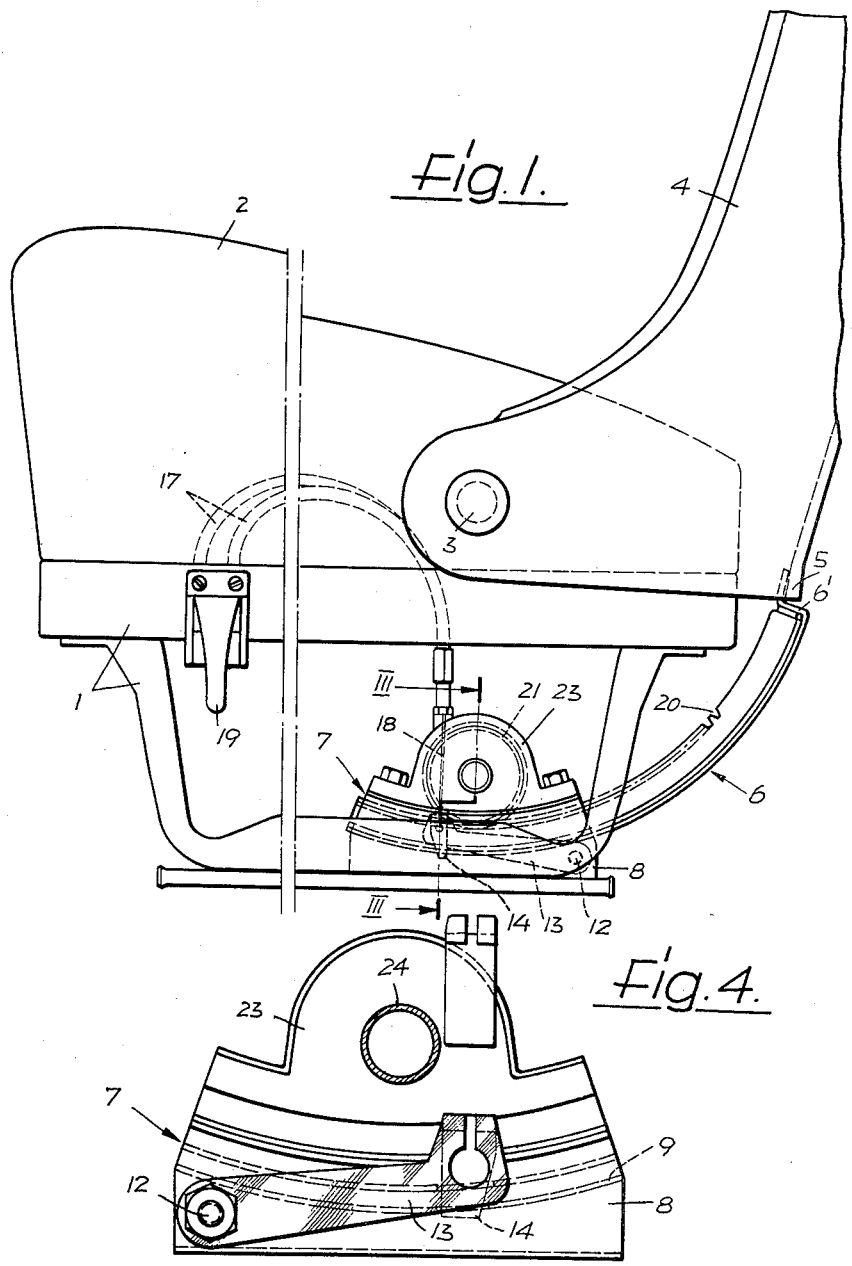
*INVENTORS*
WALTER BEIERBACH
ERNST HEINL
BY Watson, Cole, Grindle & Watson
*Attorneys*

May 29, 1962 W. BEIERBACH ETAL 3,036,862
ADJUSTING DEVICE FOR A FOLDING BACK FOR A VEHICLE SEAT
Filed Jan. 26, 1960 2 Sheets-Sheet 2
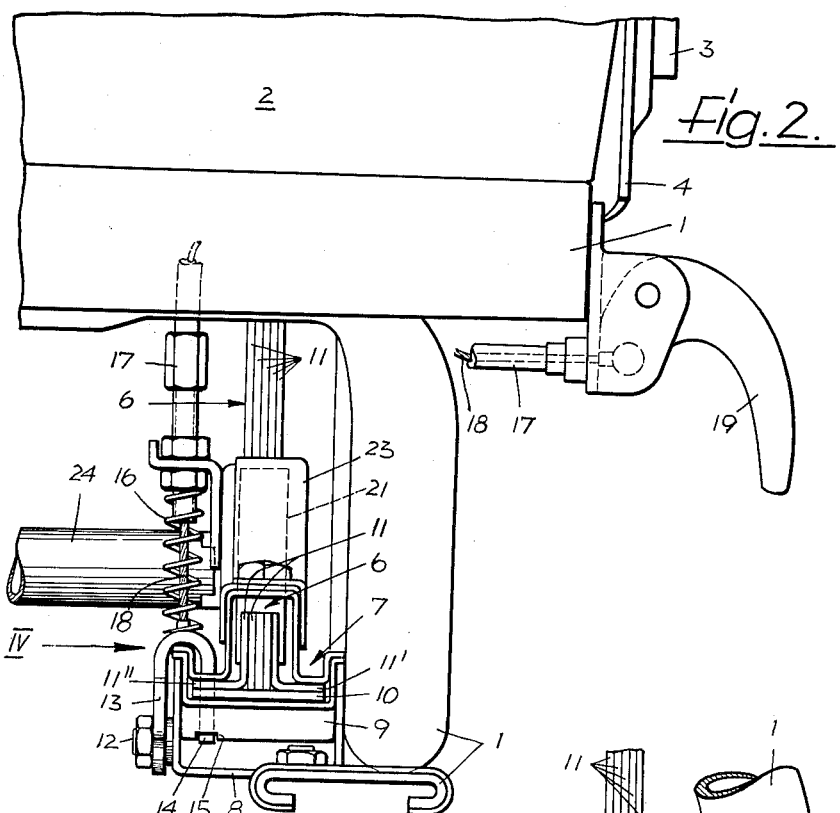
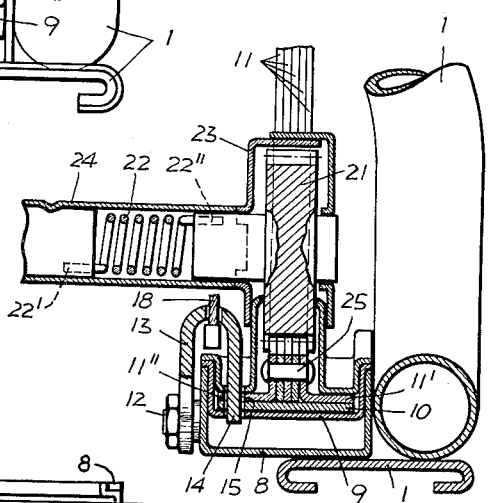
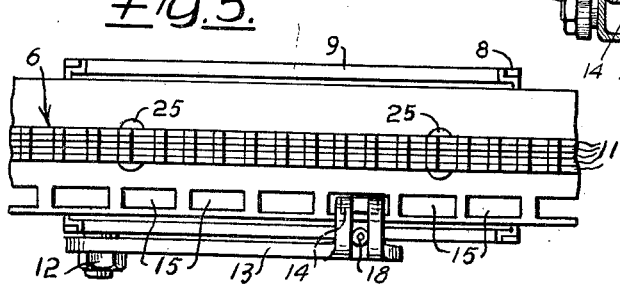
INVENTORS
WALTER BEIERBACH
ERNST HEINL
BY Watson, Cole, Grindle & Watson
ATTORNEYS United States Patent Office 3,036,862
Patented May 29, 1962

3,036,862
ADJUSTING DEVICE FOR A FOLDING BACK
FOR A VEHICLE SEAT
Walter Beierbach, Stuttgart-Weil im Dorf, and Ernst Heinl, Stuttgart, Germany, assignors to Stuttgarter Karosseriewerk Reutter & Co., G.m.b.H., Stuttgart, Germany, a firm of Germany
Filed Jan. 26, 1960, Ser. No. 5,090
Claims priority, application Germany Jan. 31, 1959
9 Claims. (Cl. 297—367)

The present invention relates to a device for adjusting the degree of inclination of a folding back of a seat of an automobile or other vehicle, and more particularly for adjusting the inclination of a folding back which has an arcuate or similar curved cross section.

It is a object of the present invention to provide an adjusting device of the above-mentioned kind which permits the folding back of a vehicle seat to be tilted back to different degrees of inclination, and it is especially applicable to a folding back with an arcuate or similar curved cross section on which other adjusting devices of prior designs cannot be applied because of the lack of straight surfaces.

This object is attained according to the invention by the provision of a supporting or stop element which is movable along an arcuate path, the center of which coincides with the pivoting axis of the folding back, and which is adapted to be locked at any angular position along such arcuate path. The supporting element according to the invention consists of an arcuately curved bar, one end of which forms the supporting or stop surface on which the folding back is adapted to rest when in its normal backward position, and which is adapted to slide in an arcuate direction within a bearing unit which is mounted on the frame of the seat, and to be locked within this bearing unit in different positions.

For this purpose, the curved bar is preferably provided with a row of locking recesses which are operatively associated with a locking lever which is pivotably mounted on the bearing unit and operated by hand, and adapted under the action of a spring to engage into any one of the locking recesses on the curved bar. In order to prevent the curved bar under the weight of the folding back from sliding through the bearing unit when the locking lever is released, the curved bar is provided with gear teeth which are in mesh with a pinion. This pinion is rotatably mounted on the bearing unit and acted upon by a spring which tends to press the curved bar against the folding back and counteracts the weight of the latter bearing upon the curved bar. The curved bar and the gear teeth thereon may be made of a plurality of arcuate plates which are provided with coinciding gear teeth and are secured to each other by any suitable means. Each of the outer plates of the bar terminates into a guide flange which is adapted to slide along the bearing unit, and one of these flanges may be provided with the mentioned locking recesses.

If similar adjusting devices are to be mounted at both sides of a seat, the housings of the pinions of both devices may be connected to each other by a tubular member in which a torsion spring is provided at each side which is connected at one end to the tubular member or to a bolt therein and at the other end to the respective pinion. The two torsion springs are thus connected to each other by the tubular member which has the effect that the two curved bars will be equally acted upon by the springs and be equally pressed against the folding back of the seat when the locking lever is released.

These and other objects, features, and advantages of the present invention will further appear from the following detailed description thereof, especially if the same is read with reference to the accompanying drawings, in which:

FIGURE 1 shows a side view of the adjusting device according to the invention;

FIGURE 2 shows an enlarged view of the adjusting device as seen in the direction toward the rear of the vehicle;

FIGURE 3 shows a cross section taken along line III—III of FIGURE 1 and illustrates an adjusting device which is to be mounted at each side of a seat;

FIGURE 4 shows a view of the adjusting device as seen in the direction shown by the arrow IV in FIGURE 2; while FIGURE 5 shows a top view of the adjusting device in which the pinion housing has been omitted.

Referring to the drawings, the frame 1 of a vehicle seat carries a seat cushion 2 and a folding back 4 which is preferably of an arcuate or similarly curved cross-sectional shape and pivotably secured to frame 1 so as to be movable about pivots 3. The frame of the folding back 4 has a solid rear part 5 which in conventional seat constructions is normally adapted to rest on a stationary support.

According to the present invention, this support is made in the arcuately curved bar 6 which is movable in a direction along an arc the center of which coincides with the axis of pivot 3 of back 4, and which is adjustable to various fixed positions along this arc. This curved bar 6, the end 6' of which forms the support on which part 5 on back 4 normally rests, is adapted to slide in the mentioned arcuate direction within a bearing unit 7 which is mounted on frame 1 of the seat. This bearing unit may, for example, consist of a U-shaped bracket 8 in which an arcuate guide member 9 of a U-shaped cross section is inserted and secured. The bottom of guide member 9 has a curved guide plate 10 secured thereto along which the curve bar 6 is adapted to slide. Bar 6 may be composed of a plurality of arcuate plates 11 which are secured to each other, for example, by rivets 25. The two outer plates 11 are provided with guide flanges 11' and 11" which rest on guide plate 10 and are adapted to slide along the same.

Bearing unit 7 carries a locking lever 13 which is pivotally mounted thereon by means of a bolt 12 and terminates into a pawl 14 which engages into wedge-shaped locking recesses 15 which are provided in flange 11" on one outer plate 11 and, if desired, also in guide plate 10 and the arcuate guide member 9, as shown particularly in FIGURE 3. The bearing edge of pawl 14 is designed so as not to engage in a radial direction into flange 11" but to extend in the direction toward bolt 12 so that it cannot accidentally disengage from the locking recesses 15. Lever 13 is acted upon by a spring 16 which tends to press pawl 14 into locking recesses 15. Lever 13 may be operated directly by means of a handle thereon or, as shown in the drawings, by a Bowden cable 17, the core 18 of which is secured to lever 13 and which may be operated by a hand lever 19 which is provided at an easily accessible point on frame 1 of the seat.

In order to prevent the curved bar 6 under the load of the folding back 4 from sliding through bearing unit 7 when locking lever 13 is released, bar 6 is provided with gear teeth 20 which may be stamped into plates 11. These gear teeth 20 are in engagement with a pinion 21 which is rotatably mounted on bearing unit 7 and acted upon by a spring 22 and thus tends to press bar 6 against the folding back 4, thereby compensating the weight of the latter acting upon the end 6' of bar 6. Pinion 21 is mounted within a housing 23 which in the particular embodiment as illustrated, consists of three parts and is secured to bearing unit 7.

If similar adjusting devices as above described are provided at both sides of the seat, the two pinion housings 25 are preferably connected to each other by a tubular member 24. In this event, each spring 22 which acts upon one of pinions 21 and forms a torsion spring has one end 22′ connected to the tubular member 24 and the other end 22″ to pinion 21. In place of two torsion springs 22 at both sides of the seat, it is also possible to provide one continuous torsion spring for both pinions 21. However, the spring action upon pinion 21 may also be effected in a different manner, for example, by a coil spring.

If one of the adjusting devices according to the invention is provided at each side of the seat, it is also possible to provide a locking lever 13 at each side. The two locking levers 13 may then be either rigidly connected to each other by a common shaft or two Bowen cables 19 may be provided which may be operated by hand lever 19 and each of which acts upon one of the locking levers 13.

Although our invention has been illustrated and described with reference to the preferred embodiment thereof, we wish to have it understood that it is in no way limited to the details of such embodiment, but is capable of numerous modifications within the scope of the appended claims.

Having thus fully disclosed our invention, what we claim is:

1. A device for adjusting a folding back of a vehicle seat to different angular positions, comprising an arcuately curved member having an end portion on which said folding back is adapted to rest, and movable independently from said folding back along an arcuate path having a center coinciding with a pivoting axis of said folding back, and means for adjusting and locking said arcuately curved member at different positions along said arcuate path comprising a bearing element attached to the frame of said seat and having guide members adapted to guide said arcuate member, and said arcuate member being adapted to slide in said bearing element along said arcuate path.

2. An adjusting device as defined in claim 1, in which said bearing element comprises a pair of parallel arcuately curved plates spaced from each other, said arcuate member having a pair of curved flanges thereon extending outwardly in opposite directions, and said flanges being adapted to slide between and along said curved plates.

3. An adjusting device as defined in claim 1, in which said adjusting means also comprise a plurality of locking recesses in said arcuate member and a locking lever pivotally mounted on said bearing element and adapted selectively to engage into any one of said locking recesses, and a spring for maintaining said locking lever in engagement with one of said locking recesses, said locking lever being adapted to be disengaged manually from said locking recesses.

4. An adjusting device as defined in claim 1, in which said arcuate member comprises a curved rack having gear teeth, said adjusting means comprising a pinion in mesh with said gear teeth, and spring means acting upon said pinion and tending to move said rack in the upward direction along said arcuate path.

5. A device for adjusting a folding back of a vehicle seat to different angular positions, comprising an arcuately curved member having an end portion on which said folding back is adapted to rest, and movable independently from said folding back along an arcuate path having a center coinciding with a pivoting axis of said folding back, and means for adjusting and locking said arcuately curved member at different positions along said arcuate path comprising a bearing element attached to the frame of said seat and having guide members adapted to guide said arcuate member, and said arcuate member being adapted to slide in said bearing element along said arcuate path, and having a curved rack with gear teeth, a pinion in mesh with said gear teeth and spring means acting upon said pinion and tending to move said rack in the upward direction along said arcuate path.

6. An adjusting device as defined in claim 5, in which said rack is composed of a plurality of curved plates having gear teeth thereon, and means for securing said plates to each other with said gear teeth on each of said plates in coinciding positions.

7. An adjusting device as defined in claim 5, in which one of said devices is mounted on each side of said seat frame, each of said devices further comprising a housing containing one of said pinions, a tubular member connecting said two housings to each other, said spring means comprising a pair of torsion springs within said tubular member, one end of each of said springs being connected to said tubular member and the other end being connected to one of said pinions.

8. An adjusting device as defined in claim 6, in which said guide members comprise a pair of parallel, arcuately curved plates spaced from each other, the two outer plates of said rack being of a greater width than the inner plates, the projecting parts of said outer plates being bent in opposite directions so as to form guide flanges, said guide flanges being disposed between said curved plates and slidable along the same.

9. An adjusting device as defined in claim 8, in which one of said guide flanges has a plurality of locking recesses therein, said adjusting means further comprising a locking lever pivotably mounted on said bearing element and adapted selectively to engage into any one of said locking recesses, and spring means acting upon said locking lever for maintaining the same in engagement with one of said locking recesses.

References Cited in the file of this patent

UNITED STATES PATENTS

| | | |
|---|---|---|
| 614,997 | Smith | Nov. 28, 1898 |
| 1,773,597 | Meyerson | Aug. 19, 1930 |
| 2,310,476 | Todd | Feb. 9, 1943 |
| 2,809,691 | Norwood et al. | Oct. 15, 1957 |